May 19, 1931.  H. VICTOR  1,805,933
TIRE GUARD FOR AUTOMOBILES
Filed April 9, 1930  2 Sheets-Sheet 1
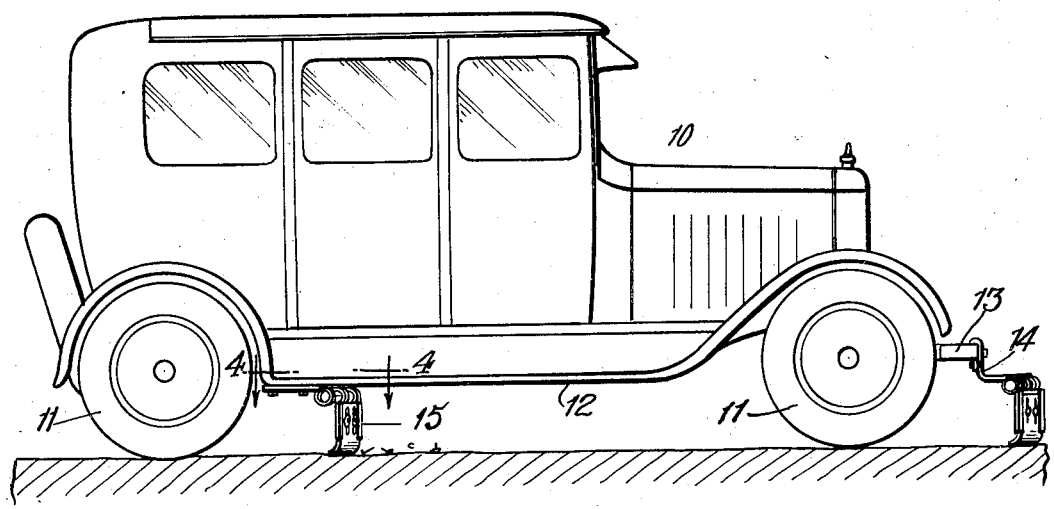
Fig. 1.
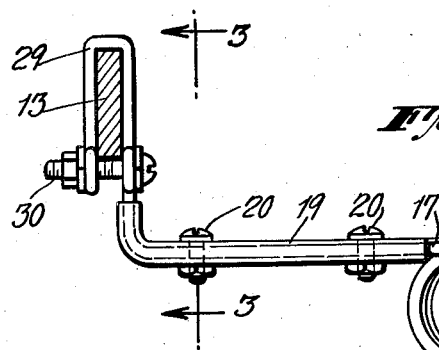
Fig. 2.
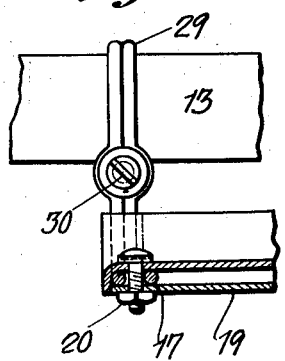
Fig. 3.
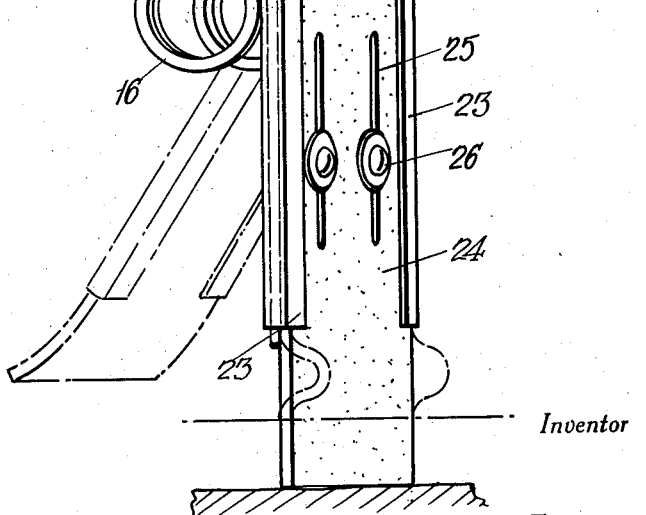
Inventor
HAROLD VICTOR.
By *Clarence A. O'Brien*
Attorney May 19, 1931.   H. VICTOR   1,805,933
TIRE GUARD FOR AUTOMOBILES
Filed April 9, 1930   2 Sheets-Sheet 2
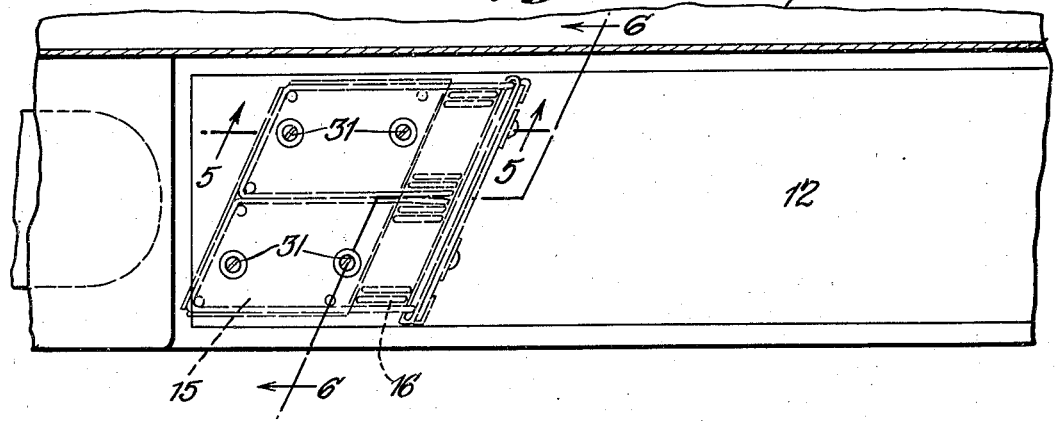
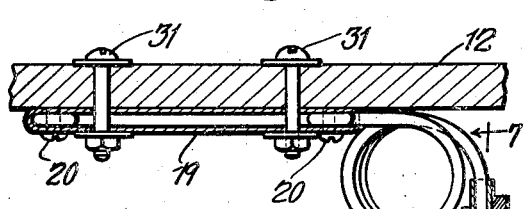
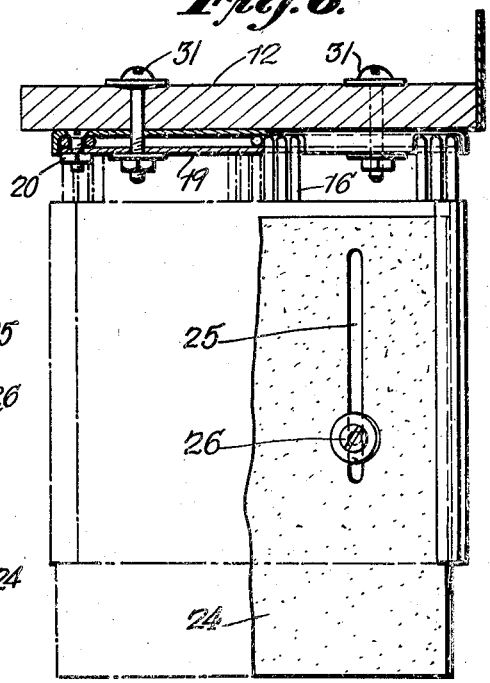
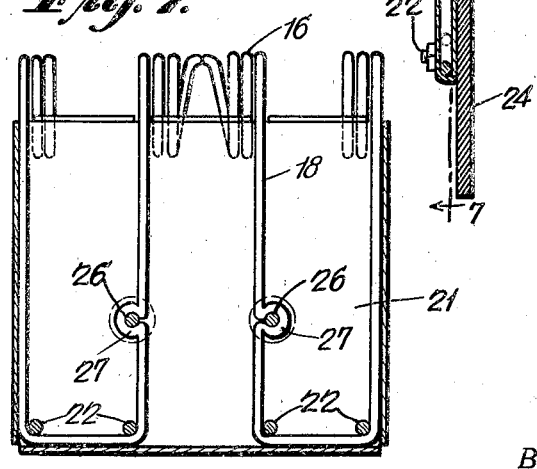
Inventor
HAROLD VICTOR.
By Clarence A. O'Brien
Attorney Patented May 19, 1931

1,805,933

UNITED STATES PATENT OFFICE

HAROLD VICTOR, OF ROSELLE, NEW JERSEY

TIRE GUARD FOR AUTOMOBILES

Application filed April 9, 1930. Serial No. 442,945.

This invention relates to improvements in sweeper attachments or tire guards for automobiles.

The primary object of the invention resides in a sweeper attachment for mounting forward of the front and rear wheels of an automobile to sweep any tacks, glass, sharp stones, or other puncturing articles out of the path of the pneumatic tire, thus minimizing the danger and inconvenience of tire punctures.

Another object of the invention is to provide a sweeper attachment having spring means by which a flexible sweeping element is normally held in contact with the road at an angle relative to the length of the vehicle so as to sweep any puncturing particles outwardly away from the vehicle, and which permits passage of the flexible sweeping element over any fixed uneven surface or bump without causing damage to the attachment.

A further object is the provision of a sweeper attachment for sweeping any loose particles from the path of the pneumatic tires of an automobile to increase the easy riding qualities of the vehicle.

With these and other objects in view, the invention resides in the certain novel construction, combination and arrangement of parts, the essential features of which are hereinafter fully described, are particularly pointed out in the appended claim, and are illustrated in the accompanying drawings, in which:

Figure 1 is a side elevational view of a motor vehicle equipped with my improved tire guard or protector.

Figure 2 is an enlarged side elevational view of one of the front sweeper devices.

Figure 3 is a detail vertical sectional view on the line 3—3 of Figure 2.

Figure 4 is a detail horizontal sectional view on the line 4—4 of Figure 1.

Figure 5 is an enlarged vertical longitudinal sectional view on the line 5—5 of Figure 4.

Figure 6 is a sectional elevational view on the line 6—6 of Figure 4.

Figure 7 is a vertical sectional view on the line 7—7 of Figure 5.

Referring to the drawings by reference characters, the numeral 10 designates an automobile provided with the usual front and rear wheels 11, running board 12, and front bumper 13. Attached to the bumper 13 directly in front of each of the front wheels 11 is a front sweeper device 14, while mounted to the under side of the running board 12 directly in front of the rear wheel 11 is a sweeper unit or device 15. The sweeper devices 14 and 15 are identical in construction with the exception of the attaching means which will be hereinafter more fully described, therefore a description of one of the sweeper devices will suffice for the other.

Each of the sweeper devices 14 and 15 is constructed of a spring coil 16, the terminal ends of which are normally disposed at right angles to each other and are bent to provide wire frames 17 and 18. It might here be stated that each spring is constructed of a single piece of springy resilient wire bent into the shape as shown in the drawings. Covering opposite sides of the horizontal wire frame 17 are metal plates 19, the same being secured together by screws or bolts 20, which bolts pass through eyes bent from the wire frame for the purpose of securing the said plates to said frame.

The vertical wire frame 18 is also covered by plates 21 secured together by fastening elements in the nature of bolts or screws 22, the outer front plate having its side edges bent inwardly to provide channels or flanges 23 for slidably accommodating a relatively stiff flexible sweeper element 24 in the nature of a strip of rubber or other like material. Passing through the plates 21 and through vertical longitudinal slots 25 in the sweeper element 24, are threaded screws or bolts 26, the same also passing through eyes 27 bent out of the frame 18, the free threaded ends of the bolt receiving thumb nuts 28, the sweeper element 24 is of a length to extend below the bottom of the holder plate 21 and the same may be vertically adjusted by the loosening of the thumb nut 28 and the manual sliding or movement of the sweeper element 24 to the desired position, after which of course the thumb nuts 28 are tightened up to secure the wire element in its position of adjustment.

By reference to Figures 2 and 4 of the drawings, it will be observed that the axis of the spring coil 16 is disposed at an angle so as to dispose the sweeper element 24 at an angle when in an applied position to cause the sweeping aside of any particle with which the said element may come in contact.

As before stated, the sweeper devices 14 and 15 are identical in construction with the exception of the attaching means, and for mounting the front sweeper device 14 to the bumper 13, I carry the horizontal frame 17 upwardly and bend the same into a hook 29 for hooking engagement with the bumper 13. Fastening elements 30 pass through alining eyes in the hook portion for the purpose of clamping the hook to the bumper 13.

As mentioned hereinbefore, the rear sweeper member 15 is secured to the underside of the running board 12, and for the purpose of mounting the same thereon, I pass bolts 31 through the running board and through bolt openings provided in the plate 19 with which the wire frame 17 is covered.

From the foregoing description, it will be seen that when the sweeper devices 14 and 15 are respectively mounted forward of the front and rear wheels 11, the same will be disposed in the path of the pneumatic tire of said wheels, but by reason of the fact that the flexible sweeper elements 24 are adjusted relative to the road so that they flexibly contact therewith, any particle such as tacks, glass, sharp stones which might be disposed in the path of the tire is swept outwardly beyond the path of the wheel, thus preventing possible puncture of the tire. The sweeper devices also serve to cause easier riding of the automobile due to the fact that any loose particles in the path of the wheel are swept out of way to prevent said wheels from passing thereover. Should the automobile or vehicle pass over a rough or uneven road which might cause the body of the vehicle to rebound, no damage will result to the sweeper devices, as the sweeper elements 24 will kink up as illustrated in dotted lines in Figure 2 of the drawings. The spring member 16 provides the desired yielding connection for the sweep frame 18 so that the sweep will swing upwardly upon striking any rigid object over which the wheels may pass and after passing thereover the spring will return the sweep to its normal position. Thus the sweep is protected from injury. It of course will be understood that in time, the bottom edge of the sweeper element 24 will wear away due to contact with the road, but by lowering the sweeper elements relative to its holder, the same may be used until it is worn to such an extent that it has no longer life. At such time the worn sweeping element may be replaced by a new one.

While I have shown and described what I deem to be the most desirable embodiment of my invention, it will be understood that various details of construction may be resorted to if desired, and I do not limit myself to the detailed construction herein set forth, nor to anything less than the whole of my invention, limited only by the appended claim.

Having thus described the invention, what I claim as new and desire to secure by Letters Patent is:—

In a sweeper attachment for automobiles, a single length of bendable resilient wire, said wire bent into a spring coil and a pair of angularly disposed frames, plates secured to and covering said frame, a flexible sweeper element, and means for adjustably mounting said sweeper element on the plate of one of said frames.

In testimony whereof I affix my signature.

HAROLD VICTOR.